United States Patent
Cutler (10) Patent No.: US 10,438,161 B2
(45) Date of Patent: Oct. 8, 2019

(54) SYSTEM, METHOD, AND DEVICE FOR SCHEDULING, SELECTING, AND DELIVERING GIFTS, GREETING CARDS, AND POSTCARDS

(71) Applicant: Glenn R. Cutler, Boca Raton, FL (US)

(72) Inventor: Glenn R. Cutler, Boca Raton, FL (US)

(*) Notice: Subject to any disclaimer, the term of this patent is extended or adjusted under 35 U.S.C. 154(b) by 0 days.

(21) Appl. No.: 13/652,462

(22) Filed: Oct. 15, 2012

(65) Prior Publication Data
US 2013/0097044 A1    Apr. 18, 2013

Related U.S. Application Data

(63) Continuation of application No. PCT/US2012/060323, filed on Oct. 15, 2012.

(60) Provisional application No. 61/547,657, filed on Oct. 14, 2011.

(51) Int. Cl.
*G06Q 30/00* (2012.01)
*G06Q 10/08* (2012.01)
*G06Q 30/06* (2012.01)

(52) U.S. Cl.
CPC ....... *G06Q 10/083* (2013.01); *G06Q 30/0621* (2013.01)

(58) Field of Classification Search
CPC ...................... G06Q 30/0601–0645
USPC ........................... 705/26.1–27.2
See application file for complete search history.

(56) References Cited

U.S. PATENT DOCUMENTS

| 7,356,490 | B1* | 4/2008 | Jacobi et al. | 705/26.8 |
| 2004/0254859 | A1* | 12/2004 | Aslanian, Jr. | 705/27 |
| 2006/0122926 | A1* | 6/2006 | Hsu et al. | 705/35 |
| 2008/0208745 | A1* | 8/2008 | Friedman et al. | 705/41 |
| 2011/0060437 | A1* | 3/2011 | Durham et al. | 700/97 |

OTHER PUBLICATIONS

Yu, C. (2010). Gift *giving and gift card research (Order No. 3414954). Available from ProQuest Central; ProQuest Dissertations & Theses Global. (737511644). Retrieved from https://search.proquest.com/docview/737511644?accountid=14753.*

* cited by examiner

*Primary Examiner* — Resha Desai
(74) *Attorney, Agent, or Firm* — Pearson IP; Loren Donald Pearson (57) ABSTRACT

A method selects, customizes, and sends gifts automatically to recipients based on sender preferences, gift data, and recipient data that are pre-entered. Examples of gifts that can be sent include greeting cards, postcards, floral arrangements, and candy. The method allows for a user/sender to enter preferences. Matching gifts are selected, customized, and then are sent. Senders no longer have to travel to gift-card stores to buy gift-cards. In addition, senders do not need to remember dates and send gifts with sufficient lead time. The system sends the gift on time and chooses gifts that match the sender's/user's tastes and preferences.

17 Claims, 6 Drawing Sheets

| | ROMANTIC | HUMEROUS | SENTIMENTAL | BIRTHDAY | ANNIVERSARY | VALENTINE | SYMPATHY |
|---|---|---|---|---|---|---|---|
| BOUQET 1 | 1 | 0 | 0 | 1 | 1 | 1 | 0 |
| BOUQET 2 | 0 | 0 | 1 | 0 | 0 | 0 | 1 |
| CARD 1 | 1 | 0 | 0 | 0 | 0 | 1 | 0 |
| CARD 2 | 0 | 1 | 1 | 1 | 0 | 0 | 0 |
| CANDY 1 | 1 | 0 | 0 | 0 | 0 | 1 | 0 |
| CANDY 2 | 0 | 0 | 0 | 0 | 0 | 0 | 1 |

| | TITLE | FIRST NAME | MIDDLE NAME | LAST NAME | GENDER | DOB | HUMEROUS | ROMANTIC | EMAIL |
|---|---|---|---|---|---|---|---|---|---|
| SENDER 1 | MS. | JANE | L. | DOE | F | 1/1/2000 | 1 | 1 | JANE@PROVIDER.COM |
| SENDER 2 | DR. | JOHN | A. | SMITH | M | 12/31/1960 | 1 | 0 | DOCTORJOHN@BIZ.COM |

FIG. 3

| | LINKED TO USER | FATHER | SON | MOTHER | BUSINESS | ROMANTIC | HUMOROUS | RELIGIOUS |
|---|---|---|---|---|---|---|---|---|
| USER 1 | USER 4 | 1 | 0 | 0 | 0 | 1 | 1 | 0 |
| USER 2 | | | | | | | | |
| USER 3 | USER 4 | 0 | 0 | 1 | 0 | 1 | 0 | 1 |
| USER 4 | USER 1 | 0 | 1 | 0 | 0 | 1 | 0 | 0 |
| USER 4 | USER 2 | 0 | 0 | 0 | 1 | 0 | 0 | 0 |

FIG. 4

|  | EVENT | GIFT | REPEAT |
|---|---|---|---|
| SENDER 1 | 10/31/2012 | CARD 1 | ANNUALLY |
| SENDER 1 | 2/14/2012 | CARD 2 | ANNUALLY |
| SENDER 2 | 7/4/2012 | CARD 3 | ANNUALLY |

FIG. 5

| | OCASSION | RECIPIENT | GIFT | MESSAGE |
|---|---|---|---|---|
| SENDER 1 | VALENTINES | USER 2 | CARD 1 | I LOVE YOU |
| SENDER 1 | GRADUATION | USER 3 | CARD 2 | NICE WORK! |
| SENDER 2 | 4/15/2012 | USER 4 | CARD 3 | REMEMBER, PAYING MORE TAXES IS A SIGN OF A SUCCESSFUL YEAR |

FIG. 6

SYSTEM, METHOD, AND DEVICE FOR SCHEDULING, SELECTING, AND DELIVERING GIFTS, GREETING CARDS, AND POSTCARDS

CROSS-REFERENCE TO RELATED APPLICATIONS

This application claims the benefit of provisional Application No. 61/547,657, filed Oct. 14, 2011; this application is a continuation of International Application No. PCT/US2012/060323, filed Oct. 15, 2012, which designated the United States and which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to greeting cards, and, in particular, to methods for automating greeting-card delivery.

Description of the Related Art

The process of selecting, purchasing, and mailing physical greeting cards is currently fragmented, inefficient, inconvenient, and exorbitant.

The current process used for selecting, purchasing, and mailing physical greeting cards through in store purchases (i.e. brick and mortar stores such as a drugstore) or through the Internet (i.e. an online greeting card store) for preset dated or expected reoccurring occasions (e.g. birthday, anniversary, Christmas) or unexpected, non-reoccurring occasions (e.g. get well, sympathy, congratulations) utilizes a cumbersome, inconvenient, expensive, inefficient, and repetitious process repeated from beginning to end for each greeting-card sender to greeting-card recipient.

The existing systems of sending greeting cards are inefficient, inconvenient, repetitious, expensive, and cumbersome.

While the greeting card industry is limited to brick-and-motor stores or online selection and ordering of greeting cards in an inventory to the sender, "Web 2.0" applications have been created for other businesses. The term Web 2.0 is associated with web applications that facilitate participatory information sharing, interoperability, user-centered design, and collaboration on the World Wide Web. A Web 2.0 site allows users to interact and collaborate with each other in a social media dialogue as creators (prosumers) of user-generated content in a virtual community, in contrast to websites where users (consumers) are limited to the passive viewing of content that was created for them. Examples of Web 2.0 include social networking sites, blogs, wikis, video sharing sites, hosted services, web applications, mashups, and folksonomies.

The Greeting Cards and Other Publishing in the U.S. industry comprise publishers that primarily publish greeting cards in print or electronic form. Some companies also publish products such as postcards, calendars, coloring books, yearbooks, and more.

The Greeting Cards and Other Publishing in the U.S. industry is declining rapidly as consumers shift to paperless substitutes. Revenue for greeting card, day planner, calendar, yearbook, and similar publishers is falling because consumers are increasingly using e-cards, e-mail, and social networking sites. Similarly, consumers are switching to online calendars that are easily shared with friends and coworkers, instead of the traditional wall calendars and day planners that this industry publishes. Low disposable income and a dip in business spending hastened this shift to cheaper digital alternatives during the past five years. As a result, industry revenue fell at a 6.0% annualized rate during the past five years to $5.5 billion in 2012. In 2012, an anticipated increase in consumer spending is expected to slow the revenue decline to 0.2%.

In response to a contracting market, companies in the industry are consolidating. Major company American Greetings Corporation made two significant acquisitions in 2009, buying Recycled Paper Greetings Inc. and PAPYRUS, and merging their operations to boost profitability. In early 2012, major company ACCO Brands Corporation acquired Mead-Westvaco Corporation's industry operating segment, which was considered a major company prior to this merger. MeadWestvaco had already been consolidating its operations in-house to cut costs, and this merger is expected to further boost industry profit. As a result, IBISWorld estimates that industry profit will expand in 2012 to 16.7% of revenue. Meanwhile, consolidation and exits due to shrinking demand will also result in a 5.1% five-year annualized contraction in the number of firms to 946 in 2012, compared to 1,227 in 2007.

IBISWorld anticipates that consumer spending declines on industry products will continue during the next five years. The increasing proliferation of smartphones and tablets will provide a growing share of the population with cheaper and more efficient alternatives to industry products. Average unit selling prices will also continue to decrease due to this competition, which will further hurt industry revenue. The anticipated boost in demand, as disposable income recovers, will help to slow the deterioration of industry operations during the five years to 2017. Still, IBISWorld projects that revenue will decline at an annualized five-year rate of 4.0% to $4.5 billion in 2017.

Hallmark and American Greetings are major brick-and-motor greeting card producers. Both businesses share the weakness that they are highly entrenched, large manufacturers with high overhead that are reliant upon "brick and mortar" store sales. Both have inefficient distribution where greeting card company must ship product to, and share sales and profit margins with, drug stores (e.g., Walgreens, CVS, Rite Aid, etc.). Both use supply manufacturing, which is based on projecting product demand and leads to waste in excessive inventory. This results in a high-end product cost for consumers. In-store cards average about $3.00 to $4.00 per card. Consumers must be inconvenienced to physically drive (e.g., fuel, time, money, opportunity cost) to a physical location for each and every occasion.

Existing online retailers of greeting cards such as moonpig.com, cardstore.com, treat.com, greetingcarduniverse.com, have disadvantages compared to the method and systems according to invention. Most of these companies do not own their content (greeting cards and copyright), but license their content from other artists and greeting card companies leading to shared revenue and profit arrangements for licensing agreements. Because they do not own their own greeting card content like Hallmark, and American Greetings, they are at a competitive pricing disadvantage to distributors who own their own content. These companies all use a similar traditional "online store" model where customers need to first remember an occasion by reminder (e.g., Facebook, calendar, email); then must browse, select, personalize the subject card through adding text and design; address; mail; and purchase (checkout cart internet model) for each occasion and each recipient repetitively. These companies have similar pricing models averaging between $3.00 to $4.00 per card, plus postage.

Existing postcard services are based on users posting photographs and generating keepsakes. Example companies are Apple Inc., (greeting cards) Postagram, Postcards on the Run (postcards). These businesses are Exclusively photometric-based models. They have limited "real" greeting card content by "do it yourself" card creation using pictures and texts on iPhone and iPad and emailing to the company to print and mail a "picture with text," masquerading as a greeting card. Customers must remember every occasion through reminder (e.g., Facebook, calendar, email), and personalize each card through photo selection, adding text, and emailing to company. Pricing is high—Apple charges $2.99, including postage, per card.

BRIEF SUMMARY OF THE INVENTION

The invention encompasses a system, a method, and a device for scheduling, selecting, and delivering greeting cards and postcards.

An object of the invention is to provide a greeting card delivery system that requires minimal intervention by a user once the user establishes its delivery preferences and recipient data.

An object of the invention is to provide a system for the ordering of greeting cards for unscheduled events like get-well cards and sympathy cards.

An object of the invention is to minimize the inventory of greeting cards by stocking cards based on user's preferences and scheduled deliveries.

An object of the invention is to sell more greeting cards by not requiring an affirmative act by the user for each occasion that the user designates when setting the preferences of the user's account.

The invention "captures" users because users will spend time setting up their user profile and contacts and then benefit later from the automated results. As a result, users will tend to remain users because switching to potential, subsequently-invented alternate systems will require a new setup time investment.

The greeting cards can be stored electronically and then made on a print-on-demand system.

The system can be applied to gifts, in particular, low-value perishable gifts such as greeting cards, postcards, floral arrangements, and confectionaries.

A method, according to the invention, for selecting a gift can utilize a gift database and a sender database to find gifts matching the sender's criteria. The gift database includes data about each gift. A sender or user database stores preferences of the users. Users can enter their preferences in an interview or "Wizard" process when creating an account, importing or adding recipients, or whenever the user prefers. The criteria set by the sender and those of the gift are then matched to select an appropriate gift.

The method according to the invention can utilize a database that includes data regarding a recipient's preferences. Using the recipient data and preferences can lead to selecting gifts with improved matching.

A further object of the invention is to provide a system and a method that can utilize preferences entered once by the user to select and send gifts to recipients on a on-going and repeated basis with a minimal amount of user intervention. Minimizing intervention makes the system more convenient to use and reduces the risk of accidentally forgetting to send a given on a subsequent occasion.

A further object of the invention is to provide a calendar for each user. The calendar shows the gifts that are scheduled to be sent along with recipient and the date. The calendar allows users to see scheduled gift shipments, edit scheduled shipments, and to find omitted shipments.

A further object of the invention is to provide a system whereby the shipping of goods includes an appropriate, pre-determined lead time. By including a lead time when calculating a shipping date, a sender can guarantee delivery by the actual date of the occasion.

A further object of the invention is to provide a database that stores data whenever a particular gift is sent by a sender to a given recipient. By tracking this information, the system can prevent sending a duplicative gift to a particular recipient.

A further object of the invention is to provide users with an option to review drafts of gifts before they are sent to recipients. In particular, senders can be sent a draft in advance of sending. By default, if the sender takes no action, the gift will be sent on the scheduled date.

A further object of the invention is to store a payment method of the sender. Examples of payment methods include credit cards, bank transfers, advance deposits, and the like. By having an established method of payment saved, a sender can be billed for cards as they are delivered without requiring additional authorization or intervention by the user.

A further object of the invention is to allow users to share and update contact information about recipients. For example, if a sender only has partial information on a recipient, more complete information might be shared from another user. Similarly, if another user has more-up-date information, a user can pull recipient information from another's record.

A further object of the invention is to minimize shipping costs. A user located in a given country that is remote from a recipient can schedule a gift to be sent. The system then can use a local distributor or local fulfillment center to minimize shipping time and expense.

In addition, a user visiting a foreign country can select stock photographs from where the user is visiting. The stock photograph can be used to form a greeting card or postcard. The sender can include a customized note. The greeting card or postcard can be printed at a local fulfillment center to minimize shipping time and cost. Such a system can prevent problems where a sender returns from a vacation before a recipient receives a postcard.

The system includes a database of information about the user's contacts and the user's preferences. Based on data stored by the user, the system selects greeting cards for the user and customizes the card by considering at least some of the following factors.

1. Occasion
   1.1. Reoccurring, preset, or expected occasions (e.g. birthday, anniversary, Valentine's Day, and Father's Day).

1.2. Non-Reoccurring, unexpected, or single event occasions (e.g. sympathy, get well, graduation, and Christening).

2. Personal Preferences 2.1. Humor, adult humor, sentimental photograph, and sentimental original art (sender and recipient mood or sentiment of card)

2.2. Male or Female (Sender and recipient gender)

3. Relationship 3.1. Contact relationship of sender to recipient (e.g. spouse, daughter, friend, and grandmother).

4. Personalization of greeting cards from sender to recipient including:

4.1. Salutation 4.1.1. First name (e.g. Jim)

4.1.2. First and last name (James Smith)

4.1.3. Prefix, First and Last Name (Mr. James Smith)

4.1.4. Prefix and Last Name (Mr. Smith)

4.1.5. Family Name (The Smith Family)

4.2. Closing 4.2.1. Love, sincerely, Best Wishes, XOXOXO, and Always, etc.

4.3. Signature 4.3.1. First Name (e.g. Ed)

4.3.2. First and Last Name (Ed Jones)

4.3.3. Prefix First and Last Name (Mr. Ed Jones)

4.3.4. Prefix and Last Name (Mr. Jones)

4.3.5. Family Name (The Jones Family)

5. Contact information for sender and Recipient address including:

5.1. Sender Return Address 5.2. Recipient Mail Address

By utilizing a software, electronic or technology driven process to enable greeting-card senders to pre-set personal preferences and contact relationships with their greeting-card recipients, an effective, efficient, convenient, reliable and cost-effective automated system can appropriately select a greeting card from a pool of greeting card inventory for a sender to a recipient for both reoccurring and non-reoccurring occasions. The process would be as follows.

1. Sender would establish an account and provide personal information such as name, gender, mailing address, parental status, etc.

2. Sender would upload or import family, friend, and personal contact names, mailing addresses, birthdates, anniversary dates and other relevant information from email accounts (e.g. Gmail®, Yahoo!® Mail, and Outlook) and social network accounts (e.g. Facebook® and Twitter®).

3. Sender would make personal selection choices for each contact providing information such as date of birth, gender of contact, and relationship of contact to sender (e.g. spouse, friend, teacher, or daughter).

4. Sender would make personal reference selections of greeting-card sentiment (e.g. humor, adult humor, sentimental photograph, or sentimental original art) for both reoccurring occasions (e.g. birthday and St. Patrick's Day) and non-reoccurring occasions (e.g. Baptism, graduation).

5. Sender could make greeting card personalization selections from data provided in contact information (e.g. recipient salutation for contact John Smith could be "John" or "John Smith" or "Mr. Smith") and sender's user or account information (e.g. sender signature for Edward Jones could be "Ed" or "Edward Jones" or "Mr. Jones" or "The Jones Family").

6. Users can specify their relationship to a contact. A message part (e.g. a closing) can be customized based on the relationship. For example, a user might use "Love" when signing a card to his or her spouse but use "Sincerely" when addressing a card to a business relationship.

Through this process, automated selection of appropriate greeting cards from sender to recipient could be made annually from a pool of greeting card inventory including personalization such as salutation of recipient name, note, closing of sender, and signature of sender for reoccurring occasions such as birthdays, anniversaries, and holidays without the sender needing to browse select, purchase, and mail greeting cards to the recipient year in and year out.

Additionally, through this process, automated selection of appropriate greeting cards from sender to recipient could be made on a scheduled basis (e.g. today, tomorrow, 3-5 days, one week, two weeks, four weeks, six weeks, and eight weeks) from a pool of greeting card inventory including personalization of salutation, note, closing and signature for nonrecurring and unexpected occasions (e.g. sympathy, get-well, and wedding).

Although the preferred embodiment of the invention utilizes a computerized database, the process could be performed utilizing manual technology. Generally, the terms automatically and auto-selected mean without input from the user once the system is set. The terms do not mean that the steps of the method necessarily be performed by computer or machine. For example, the database could be a non-computerized index card system. The selection process could be performed by people using the criteria to select matching greeting cards. Rather than printing on demand, the system could involve a person retrieving a selected card from a warehouse.

Thus, greeting card senders would have an extremely efficient convenient and cost-effective method for delivering appropriate greeting cards to their recipients for reoccurring and nonrecurring occasions. Through this automated process based on pre-selected criteria, the need to browse, greeting-card inventory by driving to a physical card store locations or browsing through the Internet inventory of online greeting card stores for every recipient on every occasion and going through the repetitive, time consuming, inconvenient, and expensive process of manually selecting an appropriate greeting card, personalizing, addressing, and mailing could be avoided.

The system includes a method of confirming that the birth date of a recipient was higher than a predetermined limit before sending a greeting card containing adult humor.

The system includes a database of stock photographs related to particular regions. For example, a photograph of the Eiffel tower can be associated with Paris. A user visiting Paris can drill through a series of menus and submenus (e.g. country→city). Then the system will select a postcard with an image from the city, for example an image of the Eiffel tower, to be sent to a recipient. The selection of the card can be based on other criteria. The card can be printed locally to the recipient. For an American recipient, the postcard can be printed in the United States to avoid international postage and international delivery delays.

The system simplifies the estimate of costs for internationally mailing by using local fulfillment. While identifying the domestic cost of mailing an international card is straight forward, identifying the cost of mailing from a foreign country to the user's given country is more difficult and can be affected by changes in the exchange rate.

Other features of the invention are set forth in the appended claims.

Although the invention is illustrated and described herein as embodied in a system, a method, and a device for scheduling, selecting, and delivering greeting cards and postcards, the invention is not limited to the details shown because various modifications and structural changes may be made without departing from the invention and the equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Embodiments of the invention are described below and are shown in the figures of the drawing.

A preferred embodiment of the invention is a system for automating the scheduling, selection, and delivery of greeting cards. The system includes methods for scheduling delivery of greeting cards, for selecting greeting cards, and fulfilling (i.e. delivering) the greeting cards to recipients. A further preferred embodiment of the invention is computer-readable medium storing a computer program that executes the method for scheduling, selecting, and fulfilling delivery of gifts. A further embodiment of the invention is a computer executing the computer program to allow users to execute the methods for scheduling, selecting, and delivering greeting cards.

In its preferred embodiment, the computer is a web server connected to the internet. The web server runs computer programs embodying the method. The web server is connected to a database of user data that is related to other users and information regarding a library of greeting cards. The web server is connected to a printer or printers that customize the printing of the greeting cards with data from the database and address envelops stored in the database.

Figure 6:
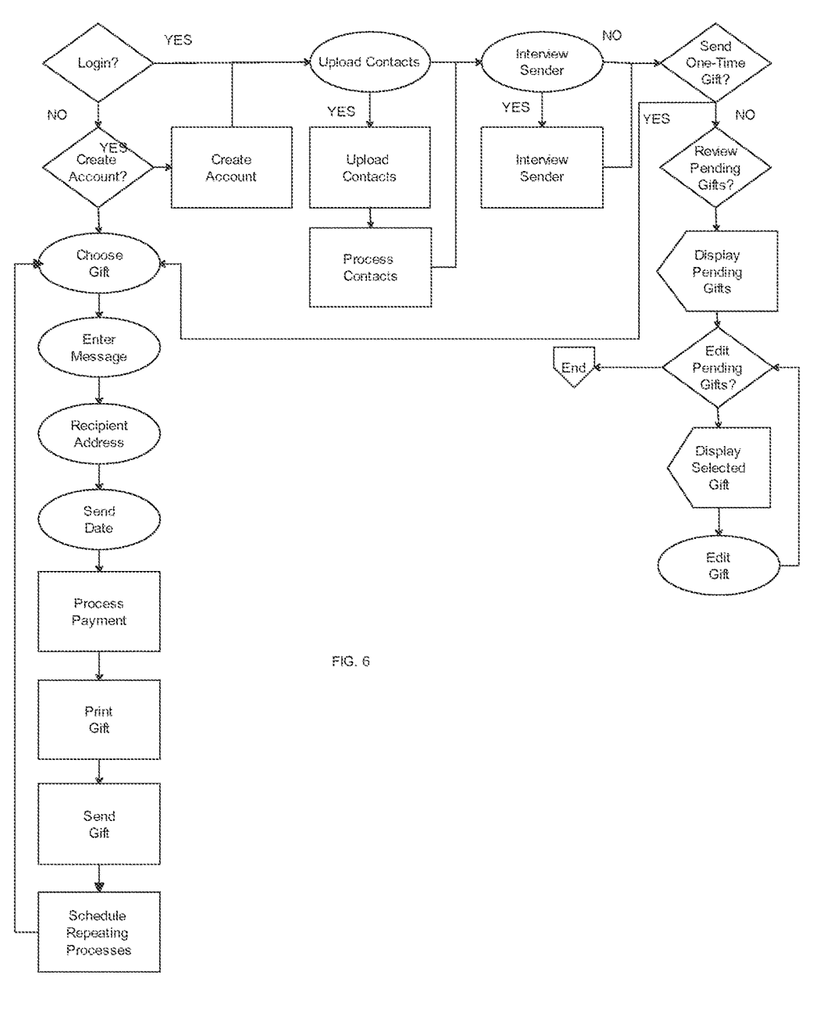
FIG. 6 is a flow chart showing embodiments of the method of selecting, customizing, and sending gifts according to the invention.

FIG. 6 shows a flowchart illustrating a preferred embodiment of the method according to the invention. Users (i.e. senders) are given the choice to register with the system or to operate as a guest user. Next, a database of recipients is built. The database can be based on information entered by the user or contact imported from other applications such as existing address books (Examples of address books are those sold under the trade names Outlook®, Gmail®, AOL® Mail, and Yahoo!® Mail) and web 2.0 applications and social networks like Facebook, Twitter, LinkedIn, and Plaxo.

As contact are imported, the sender can enter information describing the type of relationship between the user (i.e. sender) and recipient. Examples of relationship types include parent, spouse, child, friend, coworker, client, etc. Next, holidays and occasions are defined for each recipient. Holidays can be of different types such as secular, religious, and national. Information about the recipient can be used to set default holidays and occasions.

Next, the user sets his or her own user-default settings for delivery. Options include the type of closing to be printed on the greeting card the font to be printed on the greeting card, and the user's preference of humorous, adult humorous, sentimental photograph, and sentimental original art can be made.

In one embodiment, the system performs a method whereby a greeting card matching the user's criteria is selected by the system. Next, the automatically selected card has user-preselected or user-preference created comments added to the gift (e.g. greeting card). In other words, the user trusts the system to select an appropriate card and trusts the system to add an appropriate message (e.g. "XOXO, your husband"). A copy of the selected card is emailed to the user for payment and schedule confirmation. In one preferred embodiment, the user is not able to edit the gift at this time. In an alternate embodiment, the user is able to edit, reject, or approve the proposed gift.

In a second embodiment, based on the user's setting cards are selected and drafted for the user at a pre-selected time before the event. The drafts can include a set of different drafts (e.g. three cards), from which, the user can choose a card to be delivered. The user is given a period of time (e.g. three days) to choose one of the proposed cards. If no choice is made by the user, the system automatically chooses one of the cards.

In a third embodiment, the user can approve the proof, edit the proof, or cancel the proof.

Once selected, the message is printed on the greeting card and the letter is printed and stamped. The greeting-card can be printed remotely at fulfillment centers chosen to minimize delivery time and postage. In particular, foreign fulfillment centers can be used to avoid international postage costs and delays.

The font used to print on the cards can be one selected by the user. Alternatively, the font used can be randomly selected from a set of available fonts.

The system tracks cards mailed to a particular recipient to prevent duplicate cards being sent to a given recipient.

Users can allow their account information to be shared with other users to help the other users build their database. In this way, correct and up-to-date addresses and biographical information can be entered and shared.

In addition, FIG. 6 shows a method whereby the system allows registered and unregistered users to send a single gift. According to this method, the user contacts the system, preferably through a website homepage. The user can login or choose not to login. Subscribed users choose to send a one-time gift. Unsubscribed users choose not to subscribe. Next, both types of user select a gift (e.g. a greeting card, floral arrangement, or candy). Next, the users are asked for recipient information. Next, the user provides a send date. Next, the user provides payment. Based on an appropriate lead time relative to the send date, the gift is printed and/or sent to the recipient.

Figure 1:
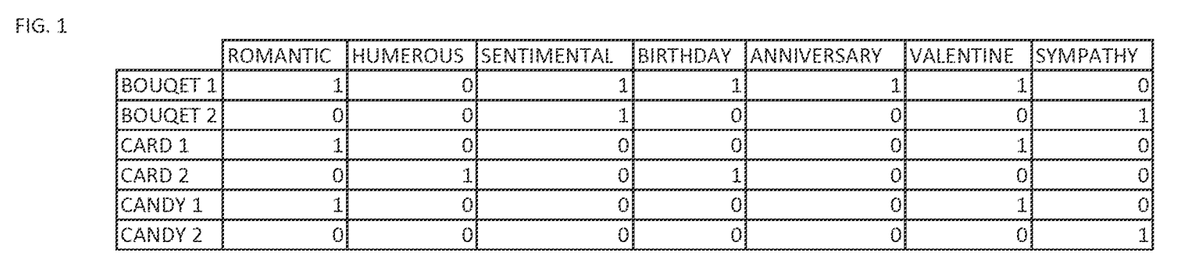
FIG. 1 is a table showing a gift database according to the invention.

FIG. 1 shows a preferred embodiment of a gift database. The gift database describes a set of gifts. Each record (i.e. row) in the table describes a given gift. Each filed (i.e. column) describes an attribute of the set of gifts. A gift tuple (i.e. cell) is defined at each intersection of a row and a column. Each gift tuple stores a gift datum that describes the gift.

Figure 2:
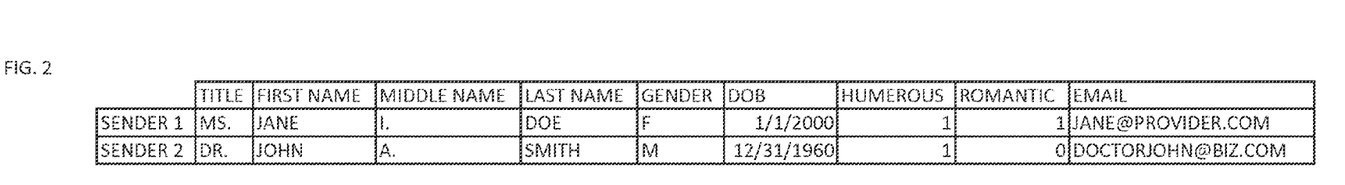
FIG. 2 is a table showing a sender database according to the invention.

FIG. 2 shows a preferred embodiment of a sender database. The sender database stores preferences of a set of senders in a table. Each sender record (i.e. row) corresponds to a given sender in the set of senders. Each sender field (i.e. column) describes an attribute of each of the senders. A sender tuple (i.e. cell) is defined at each intersection of a row and a column. Each sender tuple stores an attribute of a given sender.

In one embodiment, a recipient database (i.e. a table) for storing recipient data of a set of recipients can be included. The recipient database has a recipient record (i.e. row) corresponding to a given recipient. A recipient field (i.e. column) describes a delivery datum of each of the recipients. A recipient tuple (i.e. cell) is defined at each intersection of a row and a column. Each recipient tuple stores an attribute of a given recipient.

Figure 3:
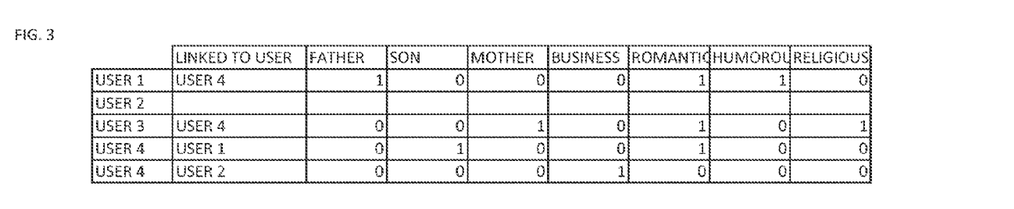
FIG. 3 is a relationship table according to the invention showing relationships between users.

In an alternative embodiment, the sender database and recipient database are contained in one table. FIG. 3 shows a relationship table, which is used to link people in the combined sender/recipient database. Each record (i.e. row) describes a user (i.e. a sender) and relates that record to another user. The other fields describe the relationship with the first user to the second user or recipient.

Figure 4:
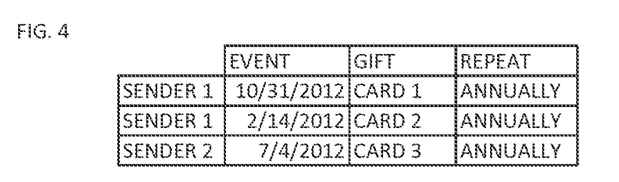
FIG. 4 is a table showing a calendar database according to the invention.

FIG. 4 shows a preferred embodiment of a calendar database for describing a set of dates. The calendar database has a sender record (i.e. row) related to a given sender. The calendar database has an event field storing a set of dates related to when a gift should be sent. At the intersection of each sender record and event field, a date tuple storing a date datum. The date tuple is further related to a gift to be sent.

Figure 5:
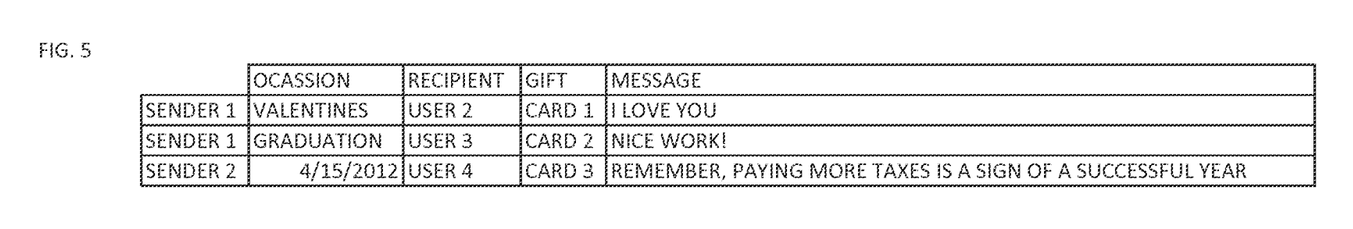
FIG. 5 is a table showing a message database according to the invention.

FIG. 5 shows a preferred embodiment of a message database for storing a set of messages that can be printed on a gift, in particular a greeting card. The message database has a sender record related (i.e. row) related a given sender. A message field stores a set of messages that can be selected or inputted to be printed on a card. A message tuple field is located at the intersection of each sender and message field and stores a message that is to be printed on the gift.

Unless otherwise mentioned the reference numbers are used consistently throughout the figures.

What is claimed is:

1. A method for selecting and inscribing a greeting card, which comprises:
   providing a greeting card database for describing a set of greeting cards, said greeting card database having a greeting card record corresponding to a greeting card in said set of greeting cards, a greeting card field describing an attribute of each of said greeting cards, and a greeting card tuple related to said greeting card record and said greeting card field and storing a greeting card datum describing said greeting card;
   providing a sender database for storing preferences of a set of senders, said sender database having a sender record corresponding to a sender in said set of senders, a first sender field describing a greeting card preference of each of said senders, a second sender field describing a message preference of each of said senders, a first sender tuple related to said sender record and said first sender field and storing a first sender datum describing said greeting card preference of said sender, a second sender tuple related to said sender record and said second sender field and storing a second sender datum describing said message preference of said sender;
   determining, by at least one computer, said greeting card from said set of greeting cards by matching said greeting card datum of said greeting card and said greeting card preference of said sender;
   providing a message database for storing a set of messages, said message database having a sender record related to said sender, a message field storing a set of messages that can be printed on said greeting card, a message tuple field being related to said sender record and said message field and storing a message, a message attribute field storing an attribute of said message, and message attribute tuple being related to said message, said message attribute tuple storing a message attribute of said message;
   determining, by said at least one computer, said message from said set of messages by matching said message attribute with said message preference of said sender;
   printing said message on said greeting card;
   providing a calendar database for describing a set of dates, said calendar database having a sender record related to said sender, and an event field storing a set of dates, and a date tuple related to said record and said event field, said date tuple storing a date; said date tuple being further related to said greeting card; and
   sending said greeting card to said recipient at a predetermined time before said date without prompting from said sender.

2. The method according to claim 1, which further comprises:
   providing a recipient database for storing recipient data of a set of recipients, said recipient database having a recipient record corresponding to a recipient in said set of recipients, a recipient field describing a recipient datum of each of said recipients, and a recipient tuple related to said recipient record and said recipient field and storing a recipient datum describing said recipient; and
   addressing said greeting card to said recipient using said recipient datum of said recipient.

3. The method according to claim 2, wherein:
   said recipient datum is a date;
   said sender datum is entered before said recipient datum; and
   matching said sender datum to said greeting card datum at a time based on said date.

4. The method according to claim 2, which further comprises:
   providing a further recipient record in said recipient database for a further recipient in said set of recipients and a further recipient tuple in said recipient database, said further recipient record being related to said further recipient tuple and related to said recipient field, said further recipient tuple storing a further recipient datum describing said further recipient; and
   selecting a further greeting card from said set of greeting cards for said further recipient by using said sender datum and said greeting card datum.

5. The method according to claim 4, which further comprises sending said further greeting card to said further recipient without further inputting sender preferences.

6. The method according to claim 2, which further comprises storing a birthday of said recipient in said recipient database.

7. The method according to claim 1, which further comprises:
   requesting said sender datum from said sender;
   inputting said sender datum; and
   storing said sender datum in said sender tuple.

8. The method according to claim 1, which further comprises:
   providing a list of a plurality of greeting cards selected from said set of greeting cards to said sender; and selecting a greeting card from said list to be sent to said recipient.

9. The method according to claim 1, which further comprises:
providing a draft of said greeting card with said message printed on said greeting card to said sender before sending said greeting card to said recipient; and
allowing said sender to edit said message before sending said greeting card to said recipient.

10. The method according to claim 1, which further comprises:
storing a payment method of a sender; and
charging said payment method whenever one of said greeting cards is sent to said recipient.

11. The method according to claim 1, which further comprises sharing a recipient related to said sender to a further sender.

12. The method according to claim 1, which further comprises sending said greeting card from a country where said recipient is located.

13. The method according to claim 1, which further comprises storing a greeting card preference of said sender in said sender database.

14. The method according to claim 1, wherein said at least one computer hosts at least one of said sender database and said greeting card database.

15. The method according to claim 1, which comprises recording in a database when said greeting card was sent by said sender to said recipient to prevent said sender from subsequently resending said greeting card to said recipient.

16. The method according to claim 1, which further comprises creating said greeting card record in said greeting card database after creating said sender record in said sender database.

17. The method according to claim 1, wherein said at least one computer includes:
a first computer being programmed to perform the determining said greeting card from said set of greeting cards by matching said greeting card datum of said greeting card and said greeting card preference of said sender; and
a second computer being programmed to perform the determining said message from said set of messages by matching said message attribute with said message preference of said sender.

* * * * *